United States Patent [19]

Ormson

[11] Patent Number: 5,376,325
[45] Date of Patent: Dec. 27, 1994

[54] KITCHEN TOOLS AND METHOD OF PREPARATION

[76] Inventor: Timothy J. Ormson, 2131 Woodruff Blvd., Janesville, Wis. 53545

[21] Appl. No.: 39,653

[22] Filed: Mar. 30, 1993

[51] Int. Cl.⁵ .............................................. B29C 45/14
[52] U.S. Cl. ....................................... 264/254; 264/273; 264/274; 264/278; 264/279.1; 264/328.1; 30/324
[58] Field of Search .................. 30/324, 345, 322, 169, 30/136; 264/254, 273, 274, 328.1, 278, 279.1

[56] References Cited

U.S. PATENT DOCUMENTS

| | | | |
|---|---|---|---|
| 1,961,547 | 6/1934 | Busch | 30/345 |
| 2,873,027 | 2/1959 | Dohner | 30/324 |
| 3,254,409 | 6/1966 | Gardel et al. | 30/324 |
| 3,877,143 | 4/1975 | Montesi | 30/114 |
| 4,423,551 | 1/1984 | Chmela et al. | 30/142 |
| 4,711,029 | 12/1987 | Somerset | 30/148 |
| 4,772,653 | 9/1988 | McKenna | 524/427 |
| 4,937,942 | 7/1990 | Skerker et al. | 30/345 |
| 4,969,268 | 11/1990 | Kelly | 30/345 |

FOREIGN PATENT DOCUMENTS 42158 11/1907 Switzerland ............ 30/324

Primary Examiner—Richard K. Seidel
Attorney, Agent, or Firm—Quarles & Brady

[57] ABSTRACT

A kitchen tool has a work end of plastic molded to a reinforced plastic handle. The reinforcement is completely encapsulated in the kitchen tool which has a smooth uninterrupted outer surface. A method of making the tool also is enclosed.

3 Claims, 2 Drawing Sheets

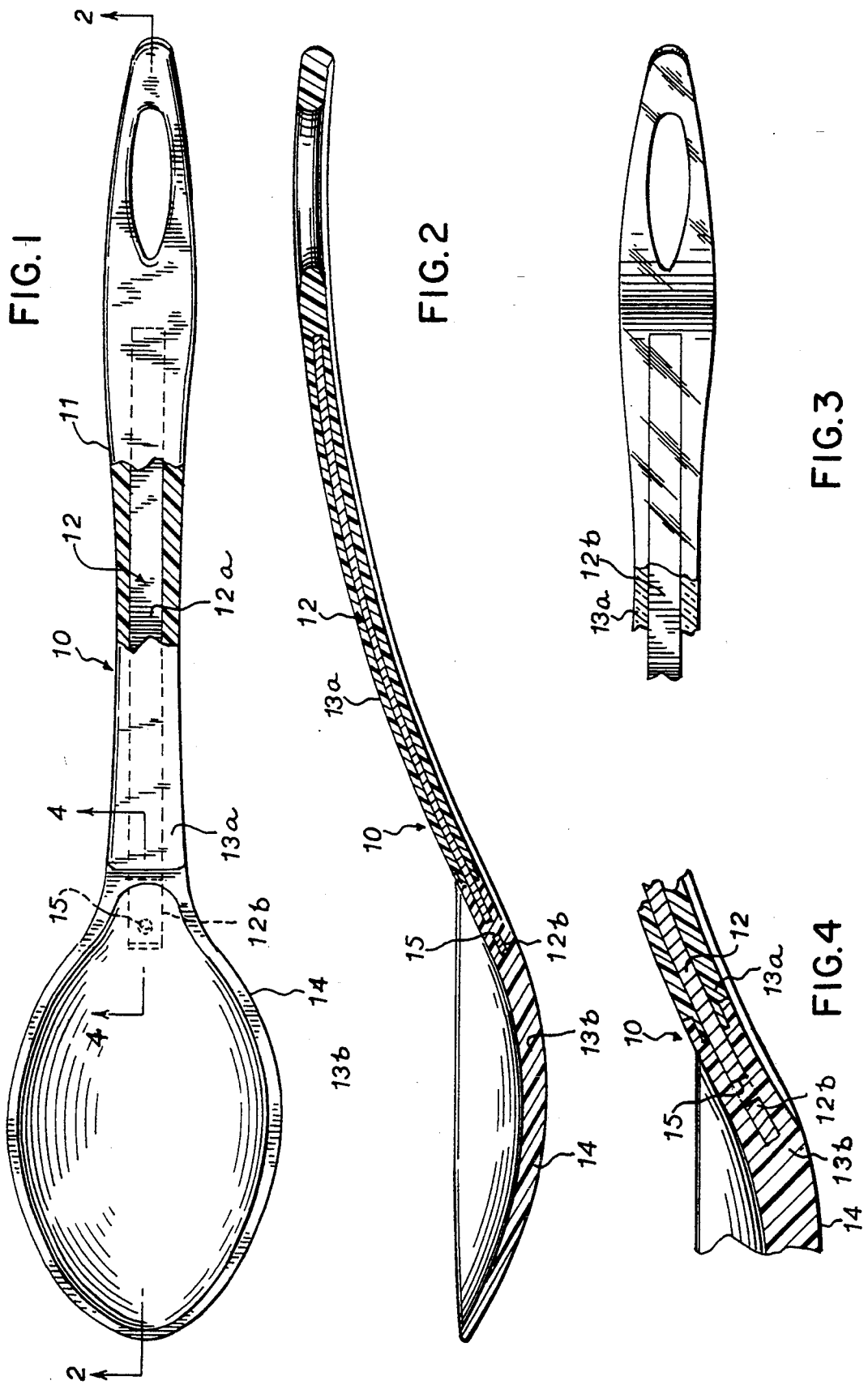

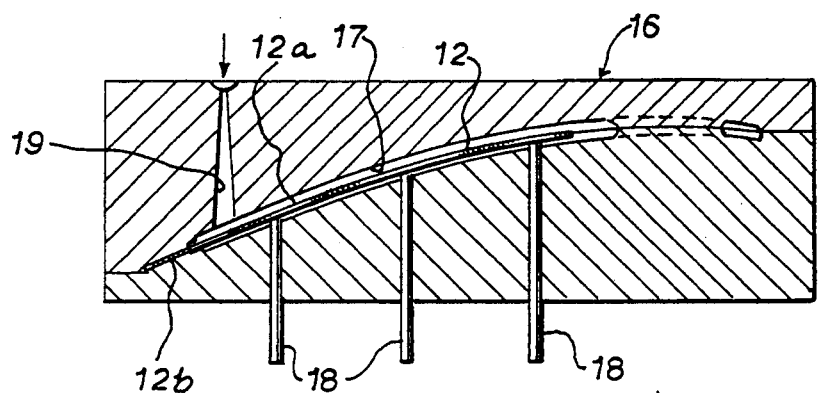
FIG.5
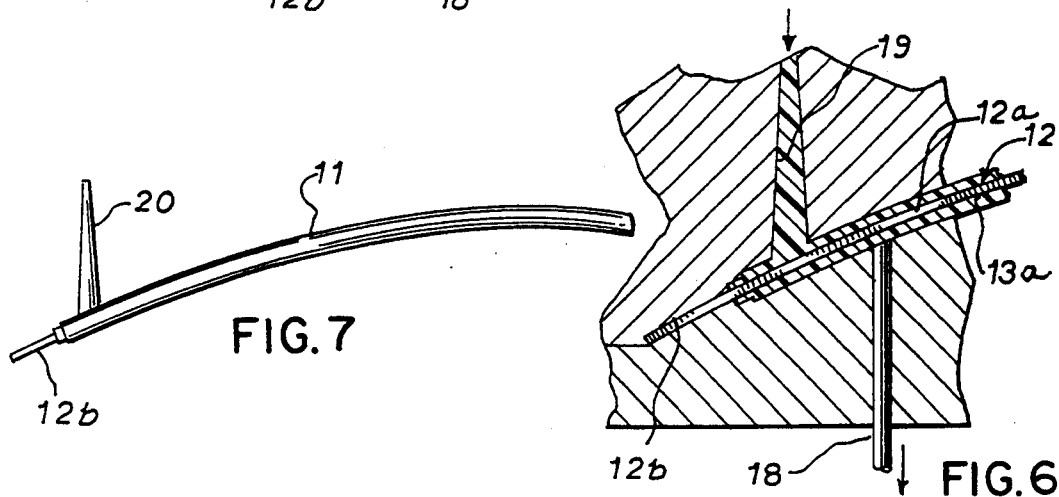
FIG.7
FIG.6
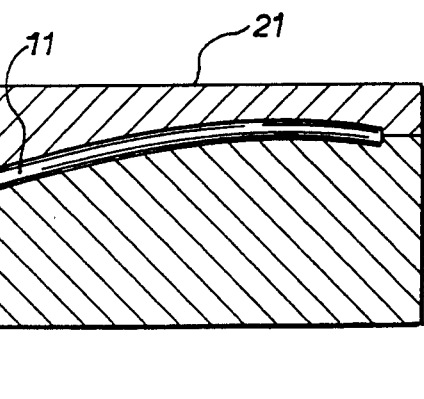
FIG.8

KITCHEN TOOLS AND METHOD OF PREPARATION

FIELD OF THE INVENTION

This invention relates to kitchen utensils and, more particularly, to plastic kitchen tools which can withstand high temperatures.

BACKGROUND OF THE INVENTION

Kitchen tools include turners, spatulas, spoons, cake cutters, forks, ladles and those other utensils that are used in the kitchen for the handling of food.

In the past, such kitchen tools have been formed completely of metal, wood or plastic. The plastic tools are more attractive than the metal ones and easier to clean than the wooden ones. However, when exposed to high temperature they can lose their necessary rigidity. More recently, such tools have been made with a metal shank connecting a plastic handle and a plastic work end. Such tools have better high temperature rigidity. Unfortunately, after repeated use, however, the connection between the shank and the handle or work end can become loose causing the tool to fail.

Ideally, kitchen tools preferably should be able to withstand the high temperatures encountered in use and in cleaning and they should be attractive. It also is important that if the tool in use encounters high temperatures that the handle stay cool enough so that it can be used. In addition, the exterior surface of the tool should be smooth and uninterrupted so that it doesn't accumulate food residue and the material of the outer surface should be compatible with food and of a material approved for food use.

It would be advantageous to have kitchen tools having a smooth, uninterrupted outer plastic surface which tools can withstand the temperatures encountered in use or cleaning without losing their rigidity.

BRIEF DESCRIPTION OF THE INVENTION

It is an object of the present invention to disclose heat resistant kitchen tools having a smooth, uninterrupted outer plastic surface which do not lose their rigidity under conditions of use or cleaning.

It also is an object of the present invention to disclose a method of preparing a kitchen tool having a smooth, uninterrupted outer plastic surface with a reinforcement which is completely encapsulated in the plastic so that the kitchen tool retains its rigidity under conditions of use or cleaning.

It also is an object to disclose a kitchen tool having a smooth, uninterrupted outer surface comprised of one or more plastics of the same or different color.

The kitchen tool of the present invention comprises a work end of a first plastic, a handle of a second plastic, and a reinforcing member having a portion thereof encapsulated in the first plastic and a portion encapsulated in the second plastic so that the tool has a smooth, uninterrupted outer surface.

The method of the present invention comprises first molding a reinforced handle by placing a reinforcing member in a first mold for the handle so that only a minor portion of one end extends out of the mold; suspending the portion of the reinforcing member in the mold with a plurality of removable pins; injecting a first liquid plastic into the mold to fill the mold cavity so that plastic surrounds the portion of the reinforcing member in the mold; withdrawing the pins; permitting the plastic to harden and removing the thus formed handle from the first mold; placing at least minor portion of one end of the thus formed handle into a second mold and molding a work end of a second plastic unto said one end of the handle to form a kitchen tool with a smooth, uninterrupted outer surface; and then removing the kitchen tool from the second mold.

In one embodiment of the present invention, the first plastic and the second plastic are the same plastic of a same or different color. In another embodiment, the first plastic and the second plastic are different plastics of the same or a different color.

The above and additional objects and advantages of the invention will be apparent to those skilled in the art.

DESCRIPTION OF THE DRAWINGS

In the Drawings:

FIG. 1 is a top plan view, partly in section of a kitchen tool of the present invention;

FIG. 2 is a view taken along lines 2—2 of FIG. 1;

FIG. 3 is a partial view, partly in section, of the handle of the tool of FIG. 1;

FIG. 4 is a view taken along lines 4—4 of FIG. 1; and

FIG. 5 and 6 are schematic views illustrating the method of molding the handle;

FIG. 7 is a plan view of the handle prior to removal of the flashing; and

FIG. 8 is a schematic view illustrating the method of molding the work end unto the handle.

DESCRIPTION OF THE PREFERRED EMBODIMENT

In the preferred embodiment of the invention shown in FIGS. 1 to 4, the kitchen tool is a spoon 10 having a handle 11 reinforced by a steel rod 12. A major portion 12a of the rod 12 is completely surrounded by a first plastic 13a. A minor portion or tang 12b of the reinforcing rod 12 at one end 11a of the handle 11 extends into a work end 14 of the spoon 10 which is formed of a second plastic 13b. The tang 12b has at least one aperture 15 through which the plastic 13b extends to help anchor the tang 12b in the work end 14. As can be best seen in FIGS. 1 and 2, the spoon 10 has a smooth, uninterrupted outer plastic surface which is free of any significant irregularities in which food residue can be entrapped.

In the preferred method of the invention shown schematically in FIGS. 5 to 8, the spoon 10 is formed in two steps.

In the first step which is shown in FIGS. 5 and 6, a reinforcing rod 12 is placed into a first mold 16 so that a major portion 12a of the rod 12 is in the mold cavity and a minor portion or tang 12b extends out one end 16a of the mold 16. The reinforcing rod 12 is supported in the cavity 17 of the mold 16 by a plurality of removable support pins 18 (FIG. 6). A liquid first plastic 13a is then injected into the cavity 17 through a gate 19 so that the plastic flows under and about the rod 12. When the cavity is full and a sufficient amount of the plastic 13a is present to support the rod 12, the support pins 18 are withdrawn so that the plastic 13a will flow into the spaces formerly occupied by the pins 18 and the plastic 13a will completely encapsulate the major portion 12a of the rod 12 in the mold cavity. The plastic 13a is then hardened so that the handle 11 can be removed from the mold 15 (FIG. 7) and the flashing 20 formed by the gate 19 can be removed.

In the second step of the method, the thus formed handle 11 is positioned in a second mold 21 so that only a minor portion 11a of the handle 11 which includes the tang 12b is within the work end forming cavity of the second mold 21. A second compatible plastic 13b is then injected via gate 23 into the second mold 10 to completely surround the minor portion 11a and the tang 12b and to form the work end 14 of the spoon 10 and bond it to the handle 11. When the plastic 13b is cured or hardened the spoon 10 is removed from the second mold 20 and any flashing caused by the gate 23 or the like removed. The result is a spoon 10 which has a smooth, uninterrupted plastic outer surface. If desired, the first and second plastics, 13a and 13b respectively, can be selected so that the spoon 10 can have a work end 14 of one color and a handle 11 of another contrasting or matching color.

Any plastic which meets the described requirements for the handle of the desired kitchen tool can be used as the first plastic 13a and any compatible plastic which meets the requirements for the working end 14 can be used as the second plastic 13b. The term "compatible" as used herein means that the second plastic 13b is one that bonds to or at least does not shrink any from the first plastic 13a so that no substantial gap exists between the handle and the work end.

Although a single plastic material can be used as both the first plastic 13a and the second plastic 13b, it may be desired to use a plastic which resists stains, which is dishwasher safe and which is cool to the touch as the first plastic 13a, and to use as the second plastic 13b a material which, in addition to those properties, is more temperature resistant.

Nylon can be used as both the first plastic 13a and the second plastic 13b. However, as previously stated, the first plastic 13a and second plastic 13b can be of different materials and of contrasting or complementary colors.

The reinforcing rod 12 may be any material that functions as intended in the present invention. Especially preferred is a flat steel rod. However, rods of suitable plastic and other materials which provide the desired properties under conditions of use or cleaning also might be used.

It will be apparent to those skilled in the art that a number of changes and modifications can be made without departing from the spirit and scope of the invention. For example, although the preparation of a spoon has been described for purposes of illustration, it will be apparent that other kitchen tools and the like may be made by practice of the present invention. Therefore, it is intended that the invention be limited only by the claims.

I claim:

1. A method of preparing a reinforced plastic kitchen tool having a handle of a first plastic, a work end of a second plastic, and a reinforcing member covered completely by the first and second plastics, said method comprising:
    (a) placing a reinforcing member in a handle mold so that a tang at one end of the member extends out of the mold; said tang having at least one aperture extending therethrough;
    (b) supporting said reinforcing member in the mold with a plurality of support pins;
    (c) injecting a first liquid plastic into the mold to fill the mold and cover the portion of the reinforcing member in the mold;
    (d) withdrawing the plurality of support pins;
    (e) permitting the plastic to harden and removing the thus formed handle from the handle mold;
    (f) placing at least the tang of the reinforcing member of said handle into the cavity of a work end mold, introducing a second liquid plastic into the work end mold so that said second plastic flows through the aperture in the tang and fills the work end mold;
    (g) permitting the plastic in the work end mold, including the plastic in the aperture, to harden; and
    (h) then removing the reinforced plastic kitchen tool from the work end mold.

2. A method of claim 1 in which the first and second plastics are the same.

3. A method of claim 1 in which the first and second plastics are dissimilar.

* * * * *